United States Patent [19]

van den Eijnden

[11] Patent Number: 4,736,149

[45] Date of Patent: Apr. 5, 1988

[54] CHARGING CIRCUIT FOR ENERGY STORAGE CAPACITORS

[75] Inventor: Josephus A. van den Eijnden, Helmond, Netherlands

[73] Assignee: Oce-Nederland B.V., Venlo, Netherlands

[21] Appl. No.: 939,953

[22] Filed: Dec. 10, 1986

[30] Foreign Application Priority Data

Dec. 18, 1985 [NL] Netherlands .................... 8503475

[51] Int. Cl.⁴ .................................... H02M 3/335
[52] U.S. Cl. .............................. 320/1; 363/25; 363/124
[58] Field of Search .............. 320/1; 363/17, 24, 25, 363/124; 307/109; 323/266

[56] References Cited

U.S. PATENT DOCUMENTS

| | | | |
|---|---|---|---|
| 4,251,857 | 2/1981 | Shelly | 363/124 |
| 4,307,440 | 12/1981 | Inoue et al. | 363/15 |
| 4,325,008 | 4/1982 | Borland et al. | 363/75 |
| 4,587,604 | 5/1986 | Nerone | 363/17 |
| 4,661,896 | 4/1987 | Kobayashi et al. | 363/124 |

*Primary Examiner*—Patrick R. Salce
*Assistant Examiner*—Anita M. Ault
*Attorney, Agent, or Firm*—Reed Smith Shaw & McClay

[57] ABSTRACT

The present invention describes a charging circuit for energy storage capacitors which is especially useful in charging the energy storage capacitors used to provide the voltage supply of flashlamps in photocopying machines. The charging circuit has two series-connected d.c. converters and a current limiting device. The current limiting device has a measuring circuit for determining the current through the second d.c. converter, which is related to the output current of the first converter, and a regulating circuit for regulating the output current of the first d.c. converter and thus indirectly regulating the output current of the second d.c. converter.

7 Claims, 1 Drawing Sheet

CHARGING CIRCUIT FOR ENERGY STORAGE CAPACITORS

FIELD OF THE INVENTION

The present invention relates to a charging circuit for energy storage capacitors which is particularly useful in charging energy storage capacitors of the kind used, for example, as the voltage supply for flashlamps in photocopying machines.

BACKGROUND OF THE INVENTION

To charge an energy storage capacitor, a d.c. voltage source is required to deliver an adequate output voltage. The voltage of the energy storage capacitor at the end of the charging cycle must be adjusted as accurately as possible to allow for accurate exposure control. Also, charging must be completed in a relatively short time, but the charging current must be prevented from becoming excessive at the start of the charging cycle or the components used will become unserviceable.

U.S. Pat. No. 4,325,008 disclosed a charging circuit in which an a.c. voltage is used as the input voltage. This a.c. voltage is stepped up by means of a transformer and then rectified by a bridge rectifier. A relatively complicated transformer is used with current limiting elements (shunts). The transformer also has an auxiliary winding which is short-circuited by a TRIAC activated as soon as the capacitor has reached the required voltage by a signal from a control circuit. This circuitry ensures rapid disconnection of the charging current when the required voltage has been reached.

If a d.c. voltage is available as the output voltage, the charging current souce is usually constructed in the form of a d.c. converter, such as a push-pull converter using a transformer whose primary windings have the input current flowing through them in phase opposition by means of a suitable circuit. Under these conditions, the converter is required to satisfy high current loading requirements and the circuit must have high switching accuracy to avoid any destruction of the converter by short-circuits due to inaccuracies in the closing and opening of the switches in the primary circuit.

U.S. Pat. No. 4,307,440 discloses a controlled d.c. source with a two-stage construction in which the output voltage of the first stage is regulated and then stepped up by a series-connected d.c. converter. The output voltage of the first stage is taken from a capacitor charged by means of a pulsed charging current. Voltage regulation is obtained by varying the duty cycle of the charging current. This voltage source, however, requires numerous protective devices to limit the switching current.

Other regulated voltage supplies are disclosed in European Patent Application No. 0176425 and European Patent Application No. 0112763, while U.S. Pat. No. 4,099,225 describes a protective circuit for an inverter. French Patent Application No. 2.416.617 describes a converter circuit for the voltage supply of discharge lamps so that the lamps' intensity is independent of the supplied voltage.

It would be desirable to provide a charging circuit having great operational reliability while using simple circuitry which allows for the accurate regulation over a wide range of the charging current used to charge energy storage capacitors.

SUMMARY OF THE PRESENT INVENTION

The present invention provides a charging circuit having great operational reliability using a d.c. voltage as an input voltage and using simple circuitry to allow for the accurate regulation of the charging current over a wide range.

Generally, the charging circuit according to the present invention comprises two series-connected d.c. converters between the d.c. input voltage and the energy storage capacitor. The first converter is controlled by a control circuit and delivers a regulated d.c. output current to the second converter which in turn delivers a charging current at an increased voltage to the energy storage capacitor. A measuring circuit monitors the current through the second converter, which current is proportional to the output current of the first converter, and generates a feedback signal to the regulating circuit of the first converter. Thus, the charging current is indirectly regulated by the regulation of the output current of the first converter.

Since the direct regulation occurring at the output of the first converter is carried out in the high current/low voltage area, small current changes can be made with high accuracy thereby accurately regulating the charging current. However, since the measuring circuit is not incorporated in the high current circuit of the first converter, but in the low current circuit of the second converter, energy losses are avoided. With this system, it is possible to optimize the charging time and to accurately adjust the required final voltage of the energy storage capacitor without excessive currents occurring at the start of the charging cycle. Additionally, the breakdown voltage strength of the components used in this regulation system can be greatly reduced since they only have to satisfy small demands.

Preferably, the first d.c. converter is formed by a series circuit of a coil and a switch actuated by a control circuit which periodically interrupts the supply of d.c. voltage to the coil. When the switch is open, the circuit is closed by means of a diode on the output side which is connected to a point between the switch and the coil. In this embodiment, the output current of the converter is stabilized by the coil inductance of a short period of time while the actual stabilization is provided by the regulation system including the control circuit.

The second converter is preferably a push-pull converter. As a result of the current stabilization by the coil inductance in the first d.c. converter, even short-lived short-circuits during the reversal of the current polarity in the push-pull converter do not produce any appreciable current rises. The switching accuracy of the push-pull converter need not therefore satisfy any high requirements. Also, current peaks due to stray capacitances in the push-pull converter, such as in the transformer windings, are greatly reduced. Thus, the present invention provides a reliable and low-loss system for energy transfer using a push-pull converter of simple construction.

A measuring circuit monitors the current through the second converter and generates a feedback signal which corresponds to the output current of the first converter. The measuring circuit is preferably constructed in the form of a transformer through which flows the current flowing through the primary winding of the push-pull converter. This allows for the simple measurement of the output current at low voltage and without any galvanic connection. The feedback signal is regulated and is used to control the switch in the first d.c. converter.

Other features and advantages of the present invention will be apparent from the following detailed description and the accompanying drawing of the presently preferred embodiment of the best mode of carrying out the invention.

DESCRIPTION OF THE PREFERRED EMBODIMENT

Figure 1:
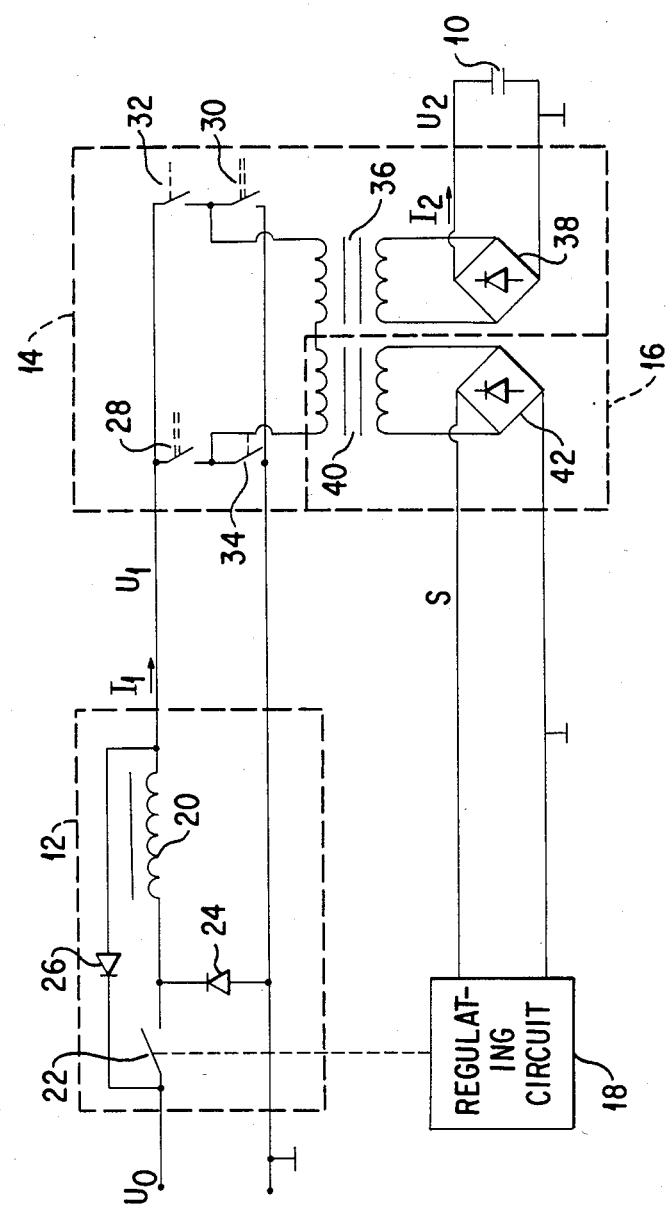
FIG. 1 is a circuit diagram showing a charging circuit according to the present invention.

The charging circuit for charging an energy storage capacitor 10 comprises a first d.c. converter 12, a second d.c. converter 14, a measuring circuit 16 and a regulating circuit 18 connected as shown in FIG. 1. First converter 12 comprises a coil 20, a switch 22 which is periodically opened and closed by regulating circuit 18, and two diodes 24 and 26. A d.c. input voltage $U_0$ of, for example, 300 V, reaches coil 20 via switch 22. When switch 22 is closed output current $I_1$ of converter 12 increases with a rise limited by the inductance of coil 20. When switch 22 is open, the circuit containing coil 20 is closed by diode 24 and output current $I_1$ decreases slowly as a result of the coil inductance. Current $I_1$ can be kept at a required value by the periodic opening and closing of switch 22. The required value is set by the duty cycle of switch 22 which is controlled by regulating circuit 18. Diode 26 limits the output voltage $U_1$ of first converter 12 to the value of the input voltage $U_0$.

Second converter 14, preferably, is a push-pull converter of a known configuration having four switches 28, 30, 32 and 34 connected in parallel in pairs, a transformer 36 whose primary winding forms a bridge circuit with the switches 28, 30, 32 and 34, and a bridge rectifier 38 connected to the secondary winding of transformer 36. Switches 28 and 30 are interconnected and are always opened and closed simultaneously. Switches 32 and 34 are correspondingly interconnected and are opened and closed in phase-opposition to switches 28 and 30. In this way, the polarity of current $I_1$ flowing through the primary winding of transformer 36 is periodically reversed. The current induced in the secondary winding of transformer 36 is rectified in bridge rectifier 38 and reaches capacitor 10 in the form of charging current $I_2$. The output voltage $U_2$ of converter 14 is a multiple of the output voltage $U_1$ of converter 12 and is limited to a maximum value of, for example, 4 kV by a control device (not shown).

Measuring circuit 16 comprises a transformer 40 whose primary winding is connected in series to the primary winding of transformer 36, and a bridge rectifier 42 connected to the secondary winding of transformer 40. Bridge rectifier 42 delivers a feedback signal S to regulating circuit 18. Feedback signal S is proportional to the output current $I_1$ of first converter 12. Current $I_1$ is regulated by circuit 18 through switch 22 in response to feedback signal S. Feedback signal S is used by regulating circuit 18 to determine the duty cycle at which switch 22 is opened and closed.

Switches 22, 28, 30, 32 and 34 are all electronic switches. A regulating circuit (not shown) for switches 28, 30, 32 and 34 is connected to regulating circuit 18 via a standard frequency divider circuit so that the switching time of the switches in converter 14 is synchronized with the switching time of switch 22. The switching frequencies are in the ratio of 2 : 1. If the switching frequency of switch 22 is, for example, f=66 kHz, then the frequency of switches 28, 30, 32 and 34 is f=33 kHz. Synchronization of the switching time eliminates any malfunction due to uneven overlapping of the switching times. It also simplifies signal assessment during testing of the charging circuit.

When capacitor 10 has reached the required voltage, switch 22 and all the switches of converter 14 are simultaneously opened so that the charging current $I_2$ is instantaneously interrupted.

While presently preferred embodiments of the invention have been shown and described with particularlity, the invention may be otherwise embodied within the scope of the appended claims.

What is claimed is:

1. A charging circuit for energy storage capacitors comprising a high voltage d.c. constant current source formed by a first and a second d.c. converter, and a current limiting device wherein (a) the first converter has a controllable output current which is fed to the second converter; (b) the second converter is connected in series with the energy storage capacitor and the first converter, and delivers a charging current at a high voltage to the energy storage capacitor; and (c) the current limiting device includes a measuring circuit for monitoring the current through the second converter, which current is proportional to the output current of the first converter, and sending a signal to a regulating circuit connected to the first converter which regulates the output current of the first converter and thereby regulates the output current of the second converter.

2. A charging circuit as described in claim 1 wherein the first converter comprises a coil connected in series to a switch, the switch being actuated by the regulating circuit to periodically interrupt the supply of d.c. voltage to the coil, and a diode connected to a point between the switch and the coil to form a closed circuit with the coil and the second converter when the switch is open.

3. A charging circuit as described in claim 2 wherein the second converter is a push-pull converter.

4. A charging circuit as described in claim 3 wherein the switching frequency of the push-pull converter is half the switching frequency of the switch of the first converter and the switching times of the push-pull converter and the switch of the first converter are synchronized.

5. A charging circuit as described in claim 3 wherein the measuring circuit comprises a transformer having its primary winding connected in series to a primary winding of the push-pull converter.

6. A charging circuit as described in claim 5 wherein the switching frequency of the push-pull converter is half the switching frequency of the switch of the first converter and the switching times of the push-pull converter and the switch of the first converter are synchronized.

7. A charging circuit as described in claim 3 wherein the measuring circuit comprises a transformer having its primary winding connected in series to the primary winding of the push-pull converter and a bridge rectifier connected between a secondary winding of the transformer and the regulating circuit.

* * * * *